(No Model.)

W. D. MISENER.
WHEEL FOR VEHICLES.

No. 374,156. Patented Nov. 29, 1887.

Witnesses
A. E. Jones.
A. T. Turnbull

Inventor
Wm. D. Misener.
By W. Bruce
His atty

UNITED STATES PATENT OFFICE.

WILLIAM DRAKE MISENER, OF WATERDOWN, ONTARIO, CANADA, ASSIGNOR OF ONE-HALF TO MARY E. CUMMINS, OF SAME PLACE.

WHEEL FOR VEHICLES.

SPECIFICATION forming part of Letters Patent No. 374,156, dated November 29, 1887.

Application filed March 22, 1886. Serial No. 196,187. (No model.)

*To all whom it may concern:*

Be it known that I, WILLIAM DRAKE MISENER, of Waterdown, in the county of Wentworth, Province of Ontario, Dominion of Canada, blacksmith, have invented certain new and useful Improvements in Carriage and Wagon Wheels; and I do hereby declare that the following is a full, clear, and exact description of the construction and operation of the same.

My invention relates to improvements in wheels, (more particularly to that style known as the "Sarven Wheel;") and the object of my improvements are to cause greater strength and durability than those as now constructed, and present a very neat, workman-like, and finished appearance. I attain these objects by the mechanism illustrated in the accompanying drawings, which form part of this specification, and in which—

Figure 2:
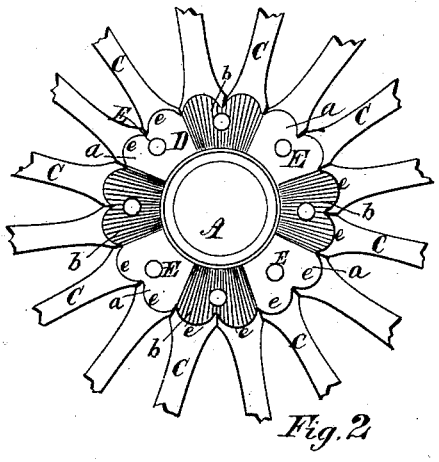
Figure 1:
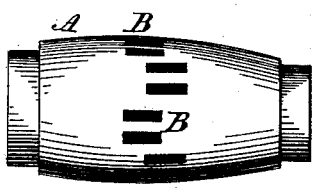
Figure 4:
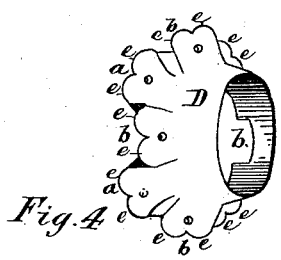
Figure 3:
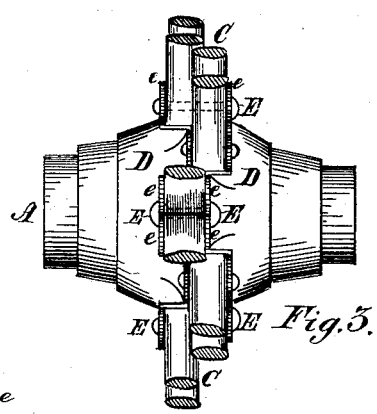
Figure 5:
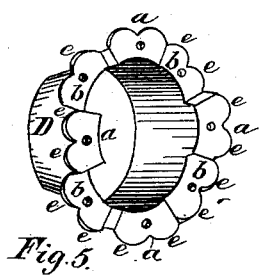

Figure 1 is a side view of wheel-hub. Fig. 2 is a side view of the central portion of a wheel. Fig. 3 is a side view of hub, with spokes attached, but broken off short. Fig. 4 is a perspective view of the outside of flanged band. Fig. 5 is a similar view of same, showing the inside.

A represents the hub, B the mortise-sockets for the spoke-tenons. They are cut in pairs and are double dodging, as shown in said Fig. 1.

C are spokes, whose ends are tenoned and inserted in pairs in the said mortise-openings B. Each pair rests firmly against the other and securely set in their mortise-openings, and when all are inserted in the hub there are four pairs of spokes set toward the outer portion of the hub alternately with four pairs set inward toward the rear or inside portion of the hub. Each pair has a bearing on the other.

D is the flanged annular band constructed with alternate projecting and recessed parts, *a b*, the width of each pair of spokes C. The said projecting parts *a* are made to fit in between each pair of spokes which are set back toward the inner part of the hub, and each pair of spokes which are set forward in the hub are let into the recesses *b* of the said band D. Two of said bands D are placed on the hub, one on the inside and the other on the outside of the spokes, and their edges have rounded extensions *e*, which run up a short distance on the spokes and secure greater strength by the bearing, while the two bands, closely fitting each pair of spokes set into the hub, as shown, are doubly stayed and braced in every direction, which prevents the wheel from going back, or, as it is usually called, "turning the disk of the wheel on the wrong side."

E are rivet-bolts, which are made to pass through holes made for them in the outer band, D, and through between the spokes and through openings in the inner band, and each firmly riveted to the said bands D, making the construction of the wheel-hub very strong and adding greatly to its appearance.

By making the bands D D double—that is, so that each of the recessed and projecting portions will receive two spokes, and providing such projecting and recessed portions *a b* with rivet-holes at or about the centers thereof—the rivets can be inserted to more securely hold the spokes in place, one rivet sufficing for each pair of spokes, as will be readily seen.

Having thus described my device and its advantages, what I claim as my invention, and desire to secure by Letters Patent, is—

In a wheel for vehicles, the combination, with the hub A, having the double-dodge mortises B B and spokes C, of the flanged bands D D, constructed with projecting and recessed portions *a b*, having rivet-holes at or about the centers thereof, and the rivets E, passing through said holes and between the spokes, substantially as described.

Dated at Hamilton, Ontario, this 24th day of February, 1886.

WILLIAM DRAKE MISENER.

In presence of—
JOHN W. CUMMINS,
WM. BRUCE.